June 24, 1941.   H. F. TÖNNIES   2,247,323
PHOTOGRAPHIC EXPOSURE APPARATUS
Filed Aug. 30, 1938   2 Sheets-Sheet 1
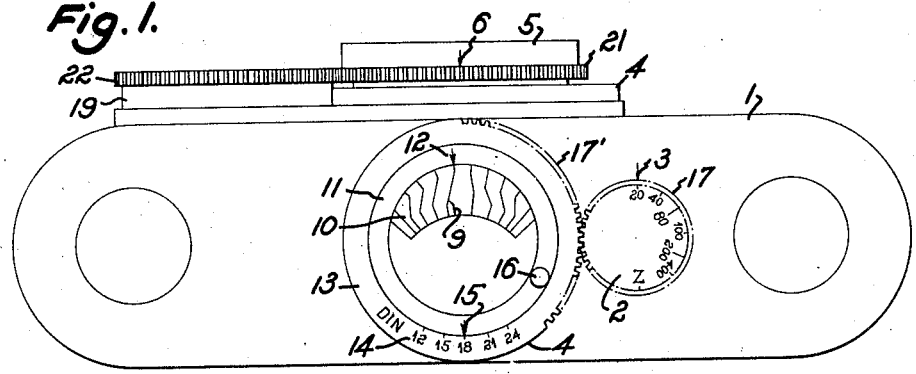
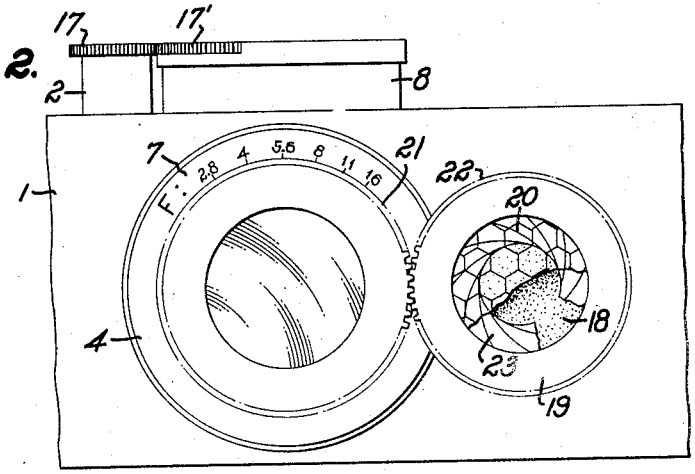

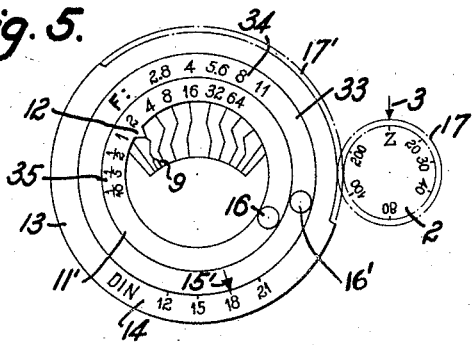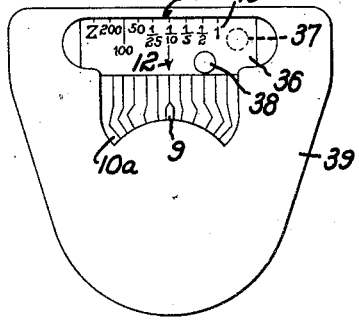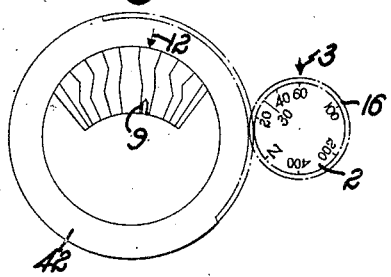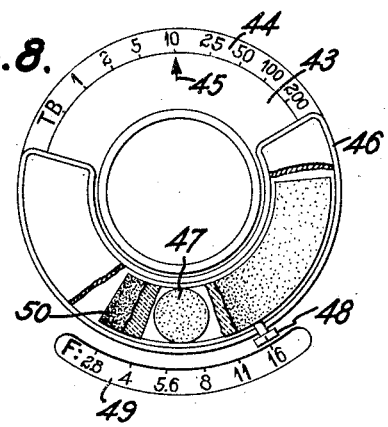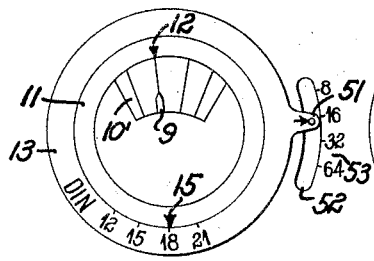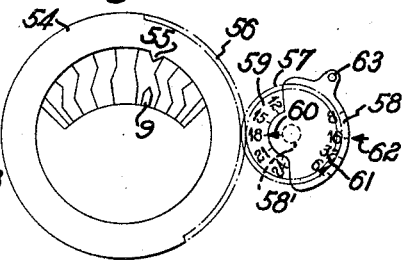

Patented June 24, 1941

2,247,323

UNITED STATES PATENT OFFICE 2,247,323

PHOTOGRAPHIC EXPOSURE APPARATUS

Hans Ferdinand Tönnies, Hamburg-Grossflottbek, Germany

Application August 30, 1938, Serial No. 227,580
In Germany September 4, 1937

8 Claims. (Cl. 95—10)

This invention relates to photographic exposure apparatus and particularly to apparatus, for use with still and motion picture cameras, of the type including a sensitive ammeter, a photoelectric cell and current modulating devices coupled to the exposure-determining mechanism of a camera.

The usual exposure mechanism includes an iris diaphragm and a shutter that are each adjustable to control the quantity of light that reaches the film. The present invention contemplates apparatus in which the adjusting members of the exposure mechanism of the camera are coupled, respectively, to an adjustable indicator on the ammeter and to a current modulating device in the photoelectric system.

An object of the invention is to provide photoelectric exposure apparatus in which the exposure mechanism of the camera and adjustable elements of a photoelectric exposure meter are mechanically coupled to facilitate the setting of the exposure mechanism in accordance with the existing scene brightness and film speed. An object is to provide exposure apparatus including adjustable devices for setting the diaphragm size and the shutter speed, a photoelectric cell in circuit with a measuring instrument having an adjustable indicator, an adjustable current modulator, and couplings between the adjustable devices of the exposure apparatus and the adjustable members of the photoelectric system, the measuring instrument including also adjustable scales to be set in accordance with film speed.

These and other objects of the invention will be apparent from the following specification when taken with the accompanying drawings in which:

Fig. 1 is a plan view of a camera provided with an embodiment of this invention;

Fig. 2 is a fragmentary front elevation of the camera;

Fig. 3 is a fragmentary or schematic plan view of another form of measuring instrument and coupled shutter setting device;

Fig. 4 is a plan view of a computer for use with the measuring instrument of Fig. 3;

Fig. 4a is a fragmentary plan view of alternative scale graduations for the computer of Fig. 4;

Figs. 5 to 7 are plan or schematic views of different measuring instrument-shutter setting combinations for use with still cameras;

Fig. 8 is a front elevation of a camera exposure mechanism in which the adjustable devices of both the shutter and the diaphragm are coupled to the photoelectric system to modulate the current output of the photocell; and Figs. 9 and 10 are plan or schematic views of measuring instrument-shutter adjusting combinations for use with motion picture cameras.

In the drawings, the reference numeral 1 identifies the casing of a small roll film camera having a focal plane shutter, not shown, that may be set for time or instantaneous exposures of desired speed by adjustment of the knob 2 with reference to the fiducial mark 3 that is fixed to the camera casing. The lens mount 4 houses the iris diaphragm, not shown, that has a rotatable adjusting ring 5 carrying a mark 6 for cooperation with a scale of stop values 7 on the lens mount 4. The parts so far described are or may be of any conventional design.

In accordance with this invention, the adjustable devices 2 and 5 of the camera exposure mechanism are mechanically coupled to adjustable members of a photoelectric exposure meter that is mounted on the camera casing. The measuring instrument of the exposure meter is a sensitive direct current galvanometer or milliammeter within a case 8 that is secured to the top wall of the camera casing adjacent the shutter setting knob 2. The instrument includes a pointer 9 that is movable over a scale plate 10 that bears a series of approximately radial lines whose outer ends are uniformly spaced and whose inner ends are spaced by corresponding but unequal displacements of the instrument needle. An indicator ring 11 at the top of the instrument case 8 carries an indicator mark 12, the ring being angularly adjustable to displace the mark 12 along the outer ends of the radial marks of the scale plate. The ring 11 is within and frictionally held to an outer ring 13 which carries a scale 14 of emulsion speeds, for example graduations in DIN degrees. The indicator ring 11 carries a mark 15 that may be set to the appropriate film speed number by turning the ring 11 by the knob 16.

The shutter setting knob 2 has a crown gear 17 in mesh with a gear sector 17' that is fixed to or formed on the outer ring 13 of the measuring instrument. Adjustment of the shutter speed therefore results in an angular adjustment of the outer ring 13, and thereby of the indicator ring 11 which is in frictional engagement with the outer ring.

The photoelectric cell 18, preferably of the barrier layer or current-generating type is mounted in a housing 19 adjacent the lens mount 6 at the front of the camera case. A shallow multiple lens plate 20 is arranged in front of the cell to restrict the light rays reaching the cell to an angular spread substantially equal to the image angle of the camera. A gear 21 on the diaphragm adjusting ring 6 of the lens mount meshes with a gear 22 on the cell housing the gear 22 being connected to the adjustable member of a device for reducing or modulating the cell output at a given light intensity. Various types of current modulating devices of electrical, optical and photoelectric types are known, and the particular type illustrated in Fig. 2 is an iris diaphragm 23.

The apparatus is employed in the following manner to set the diaphragm and shutter mechanism in accordance with the brightness of the scene to be photographed. The indicator ring 11 of the measuring instrument is first adjusted to aline the mark 15 with the emulsion speed number of the film, for example number "18" on scale 14. Either a desired shutter speed or a desired diaphragm opening may then be set by adjustment of knob 2 or ring 6. Assuming that the shutter speed knob is set, as illustrated, at 1/20 second, the camera is focused on the scene and the diaphragm ring 6 is adjusted, and thereby the iris diaphragm 23 of the photocell, to bring the instrument pointer 9 at the scale line which leads to the indicator mark 12 of ring 11. If the diaphragm is given the preliminary adjustment, the shutter speed knob 2 is subsequently rotated to aline the pointer 9 with the mark 12.

The instrument of Fig. 1 will not indicate the proper exposure factors if the light intensity is below the value that permits an automatically timed exposure when the lens diaphragm is fully open. An additional scale of graduations 24, such as the letters "a", "b", etc. may be added to the indicator ring 11 as shown in Fig. 3, to obtain this data. The instrument is otherwise the same as shown in Fig. 1 and corresponding parts are identified by the same reference numerals but will not be described in detail. The knob 2 of the shutter mechanism may overlie the instrument by placing its gear 17 below the top of the knob. This overlapping permits use of a larger diameter knob and a longer scale of shutter spaced markings. The scale includes a mark, such as the letter "Z" indicating a shutter setting for a manually timed exposure.

A calculator as shown in Fig. 4 is employed to compute the exposure data from the instrument reading that is obtained when the shutter is set for a time exposure. The calculator comprises the fixed inner and outer rings 25 and 26, respectively, and the intermediate ring 27 that has a knob 28 to facilitate adjusting the same. Inner ring 25 has a scale 29 of emulsion speeds, the intermediate ring 27 has an inner scale 30 of graduations identical with the graduations 24 of the measuring instrument and an outer scale 31 of exposure time in seconds, and the outer ring 26 has a scale 32 of diaphragm values. The ring 27 is adjusted to set the instrument reading, for example the letter "d", of scale 30 in line with the emulsion speed number of scale 29 of the inner ring. Cooperating exposure times and diaphragm openings are then found alined on scales 31 and 32.

The two outer scales may be interchanged, as shown in Fig. 4a, but the scales 31' of exposure time on the outer ring and the scale 32' of diaphragm openings on the intermediate ring must run in a direction opposite to that of the corresponding scales of Fig. 4.

Data for manually timed exposures may be obtained directly from the measuring instrument by arranging a third ring 33, see Fig. 5, between the inner indicator 11' and the outer ring 13. Ring 13 has the scale 14 of emulsion speeds and is geared to the shutter adjusting knob 2, as previously described. The intermediate ring has a projecting knob 16' and carries a mark 15' cooperating with the emulsion speed scale, and a scale 34 of diaphragm opening. The indicator ring has the mark or pointer 12 and a scale 35 of exposure times adjacent the diaphragm scale 34 of ring 33. The rings are in frictional engagement and all move with the outer ring 13 but rings 11' and 33 may be individually adjusted angularly.

Data for manually timed exposures is obtained by adjusting the camera lens diaphragm to the largest opening, thereby adjusting the iris diaphragm 23 of the photocell 18 to its largest opening, and the shutter control knob 2 is turned to aline the symbol Z with mark 3. The intermediate ring 33 of the instrument is turned to aline with mark 15' with the proper emulsion speed number of scale 14 on ring 13, and the camera is then focused on the scene. The instrument pointer 9 is deflected in accordance with the light reaching the photocell, and the inner ring 11' is then turned to bring the mark 12 on the scale line reached by the pointer. The several indicator rings are shown in the proper positions for an emulsion speed of DIN 18 and the illustrated pointer displacement, and the alined sets of graduations of scales 34, 35 show the several combinations of diaphragm openings and exposure times. It will be understood that the diaphragm scale 34 and exposure time scale 35 may be interchanged, and that the mark 15' and scale 14 may also be interchanged.

As shown in Fig. 6, the movable indicator element of the measuring instrument may be a reciprocating slide 36 that is coupled to the shutter setting mechanism, not shown, by a stud 37. The slide 36 may be provided with a stud 38 for manually displacing the slide in the instrument housing 39, and thereby to set the shutter mechanism. The slide 36 carries the indicator mark 12 and a scale of shutter speeds 40 that is movable adjacent a mark 41 on the instrument casing. The lines 10a of the scale plate have radially disposed inner ends over which the pointer moves, and parallel outer ends adjacent the slide 36.

The measuring instrument element of the described combinations may be materially simplified when only film of a predetermined emulsion speed is to be used in the camera. As shown in Fig. 7, only a single ring 42 carrying the mark 12 is required.

The exposure apparatus shown in Fig. 8 includes a current modulating system that is automatically adjusted with the setting of both the shutter speed and the diaphragm opening. The shutter is supported in the lens mount 43 and includes a ring 44 that carries a shutter speed scale and is angularly adjustable with respect to the index mark 45 on the lens mount. An arcuate housing 46 is secured to the ring 44 and carries a photoelectric cell 47. The cover of the housing has been removed for a clearer illustration of the current modulating system. The adjustable pointer 48 of the diaphragm moves along a scale plate 49 and has secured thereto and arcuate photometric wedge 50, i. e. a transparent light filter whose light absorption characteristic varies progressively from one end to the other. The measuring instrument for use with this exposure apparatus is similar to that shown in Fig. 1, but the outer ring is fixed and only the inner ring 11 is adjusted to position the mark 12 in accordance with the film speed. Either the shutter speed or the diaphragm opening may be first selected, and the camera then focused on the scene. The other exposure adjustment is then made to effect that further modulation of the photocell current which will aline the pointer 9 with the mark 12.

The embodiments shown in Figs. 9 and 10 are designed for use on motion picture cameras provided with a photocell and mechanism actuated by adjustment of the camera diaphragm to modulate the current output of the cell. In Fig. 9, the outer ring 13 of the measuring instrument has an extension 51 that may pass through or, as shown, at the exterior of the instrument case, and through a slot 52 in the camera case to the adjusting mechanism of the shutter. The scale 53 at the edge of the slot is graduated in frames per second. Since there are only a limited number of adjustments, for example only four, the guide lines of the scale plate 10' need not be uniformly spaced and may be straight radial lines.

The instrument shown in Fig. 10 has a single adjustable ring 54 which carries the indicator pointer 55 and has a gear 56 in mesh with the edge of a gear disk 57 that is in frictional engagement with the shutter adjusting member 58. The disk 57 is journalled on and the member 58 is rigidly secured to the shaft 58' of the shutter mechanism. Disk 57 has a scale 59 of emulsion speeds for cooperation with an index mark 60 on the member 58. The member 58 carries a scale 61 that is graduated in shutter adjustments and is movable adjacent the mark 62 that is fixed to the camera casing. In the case of a motion picture camera, the graduations 61 are in frames per second. A handle 63 projects from the member 58 to facilitate the adjustment of the device.

The disk 57 is first adjusted angularly with respect to the member 58 to set the proper film speed number of scale 59 in line with the mark 60. This adjustment is retained by frictional engagement of the parts when the member 58 is subsequently turned by handle 63 to aline the desired frame speed number of scale 61 with the mark 62.

For simplicity of illustration and explanation, only a single mark 12 has been shown on the indicator ring of the instrument. Further index marks for indicating pointer positions when filters are used, or when other lenses are substituted, may be placed on the indicator rings.

The several illustrated embodiments indicate that there is considerable latitude in the design of the exposure determining apparatus and it is to be understood that further modifications may be made without departing from the spirit of my invention as set forth in the following claims.

I claim:

1. In an exposure determining apparatus, the combination with a photoelectric exposure system comprising a photoelectric cell, a measuring instrument connected to said cell and having a movable pointer cooperating with a scale plate and an adjustable indicator member carrying an indicator mark, said scale plate carrying a set of approximately radial guide lines that terminate along the paths of movement of said pointer and said indicator mark respectively, and means for modulating the current flow from the cell to the instrument, of exposure apparatus including a shutter adjusting member and a diaphragm adjusting member, and means mechanically coupling said adjustable indicator member and said current modulating means to said adjustable members for actuation thereby, whereby the positions of the instrument indicator mark and pointer are automatically varied with changes in the settings of the adjustable members of said exposure apparatus; the means mechanically coupling said indicator member to its associated adjustable member comprising a coupling member mechanically connected to one of and frictionally engaging the other of said coupled members, and indicia carried by said coupling member and the member to which it is frictionally coupled for indicating relative adjustments of the same in accordance with selected values of film speed.

2. In exposure determining apparatus for use on a camera having devices individually adjustable to control the shutter and diaphragm, a measuring instrument having a pointer movable over the inner end of a scale plate bearing approximately radial guide lines whose outer ends are evenly spaced and whose inner ends are non-uniformly spaced, an adjustable indicator member movable along the outer edge of said scale plate and carrying an indicator mark that is displaced along the outer ends of said guide lines by the movement of said indicator member, and means adjustable to couple said indicator member to one of the adjusting devices of the camera in different relations in accordance with selected values of film speed.

3. In an exposure determining apparatus, the combination with a photoelectric exposure system comprising a photoelectric cell, a measuring instrument connected to said cell and having a movable pointer and an adjustable indicator member carrying an indicator mark, and means for modulating the current flow from the cell to the instrument, of exposure apparatus including a shutter adjusting device and a diaphragm adjusting device, and means mechanically coupling said adjustable indicator member and said current modulating means to said adjustable devices for actuation thereby, whereby the positions of the instrument indicator mark and pointer are automatically varied with changes in the settings of the adjustable devices of said exposure apparatus, the means mechanically coupling said indicating member to its associated adjustable device being adjustable to vary the position of the indicator mark for any given setting of the associated adjustable device in accordance with different film speeds.

4. In exposure determining apparatus, the invention as claimed in claim 3, wherein said coupling means connect the adjustable indicator member to the shutter adjusting device and the current modulating means to the diaphragm adjusting device.

5. The invention as claimed in claim 3, wherein said adjustable indicator member is a ring and said instrument has a second ring surrounding and frictionally engaging said first ring, and cooperating markings on said rings for indicating relative angular adjustments of the rings in accordance with different film speeds, the second ring forming a part of said mechanism coupling means.

6. The invention as claimed in claim 3, wherein said adjustable member is a ring and said instrument has a second ring surrounding and frictionally engaging said first ring, and cooperating markings on said rings for indicating relative angular adjustments of the rings in accordance with different film speeds; said device for adjusting the shutter comprises a knob having a top portion overlying the edge of said second ring; and said coupling means includes a gear on the edge of said second ring in mesh with a gear on said knob.

7. The invention as claimed in claim 3, wherein said indicator member carries a scale of symbols in addition to said mark; said symbols being angularly spaced along the path of said instrument pointer, and the pointer position when said shutter adjusting device is set in a predetermined position indicating the symbol for use in a calculator to compute the exposure time for a manually timed exposure.

8. In exposure determining apparatus of the type including devices individually adjustable to control a camera shutter and diaphragm, a photoelectric cell, a measuring instrument having a pointer and an adjustable indicator ring, and means coupled to the diaphragm adjusting device for modulating current flow from said cell to said instrument, characterized by the fact that said shutter adjusting device comprises a shaft having a member rigidly secured thereto, a gear disk is journalled on said shaft and in frictional engagement with said member, and the adjustable indicator ring has a gear in mesh with the gear disk; said member and disk carrying a cooperating mark and scale of emulsion speeds.

HANS FERDINAND TÖNNIES.

CERTIFICATE OF CORRECTION.

Patent No. 2,247,323.  June 24, 1941.

HANS FERDINAND TÖNNIES.

It is hereby certified that error appears in the printed specification of the above numbered patent requiring correction as follows: Page 3, second column, line 69, claim 5, for the word "mechanism" read --mechanical--; and that the said Letters Patent should be read with this correction therein that the same may conform to the record of the case in the Patent Office.

Signed and sealed this 22nd day of July, A. D. 1941.

(Seal)

Henry Van Arsdale,
Acting Commissioner of Patents.